(12) United States Patent
Lagrange et al.

(10) Patent No.: US 8,003,921 B2
(45) Date of Patent: Aug. 23, 2011

(54) COOKING APPARATUS

(75) Inventors: Valerie Lagrange, Rumilly (FR);
Christophe Gouthiere, Rumilly (FR)

(73) Assignee: SEB SA (FR)

( * ) Notice: Subject to any disclaimer, the term of this patent is extended or adjusted under 35 U.S.C. 154(b) by 691 days.

(21) Appl. No.: 11/848,433

(22) Filed: Aug. 31, 2007

(65) Prior Publication Data

US 2008/0217317 A1    Sep. 11, 2008

(30) Foreign Application Priority Data

Sep. 1, 2006   (FR) ...................... 06 07704

(51) Int. Cl.
*F27D 11/00* (2006.01)
*A21B 3/13* (2006.01)

(52) U.S. Cl. ........ 219/432; 219/250; 219/252; 219/429; 219/430; 219/433; 219/436; 219/439; 99/324; 99/422; 99/447; 99/325; 99/326

(58) Field of Classification Search .................. 219/432, 219/250, 252, 429, 430, 433; 99/324, 422, 99/447, 325–6
See application file for complete search history.

(56) References Cited

U.S. PATENT DOCUMENTS 2,952,764 A * 9/1960 Minami ..................... 219/432
3,681,568 A * 8/1972 Schaefer .................... 219/432

FOREIGN PATENT DOCUMENTS

| EP | 1 426 003 | 6/2004 |
| FR | 1 533 449 | 7/1968 |
| FR | 2 871 043 | 12/2005 |

* cited by examiner

*Primary Examiner* — Shawntina Fuqua
(74) *Attorney, Agent, or Firm* — Seyfarth Shaw LLP; Richard P. Gilly

(57) ABSTRACT

The invention concerns a cooking apparatus (1) which includes a base (3) and a receptacle (2) that rests upon the base (3). According to the invention, the apparatus includes a skirt (14) that has a closed side wall (15) surrounding the receptacle (2) and extending vertically from the base (3) up to at least the free top end (16) of the side wall (5) of the receptacle (2).

17 Claims, 2 Drawing Sheets

COOKING APPARATUS

The invention concerns a cooking apparatus, such as a fondue pot (caquelon), with a top opening to allow manipulation of the food during the cooking process.

Conventionally, a cooking apparatus of the aforementioned type includes a cooking receptacle, and a base on which to rest the receptacle, where the base includes heating means used for cooking the food placed in the receptacle.

During use, it is not unusual for a user, wishing to manipulate a food item during cooking, to come into contact with the top part of the cooking apparatus, in particular the side walls of the receptacle, and to be burnt as a result. And this drawback becomes all the more serious as the nature of the material used for the manufacture of the receptacle is a generally good conductor of heat.

This present invention aims to create a cooking apparatus that very considerably limits (or even eliminates) the risk of burns in the event of contact with the top part of the apparatus.

According to the invention, the cooking apparatus includes a skirt which has a closed side wall that surrounds the receptacle and that extends vertically from the base up to at least the free top end of the side wall of the receptacle.

As a consequence, when the user manipulates the food, he (or she) no longer makes contact with the receptacle, but rather with the skirt, and as a result, is no longer burnt (or at least the burn is much less painful). And the more the material from which the skirt is made is a poor conductor of heat, the less serious will be the burn.

Figure 1:
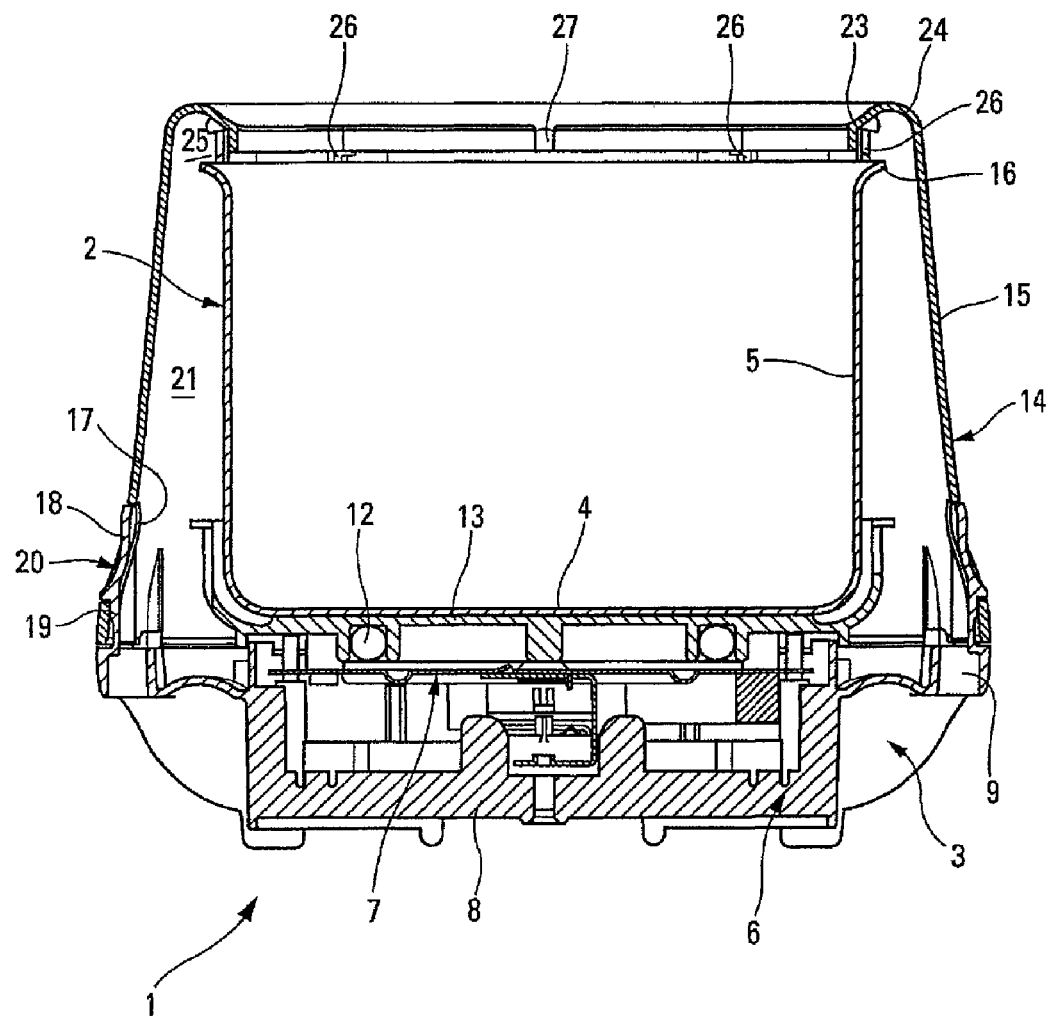
Figure 2:
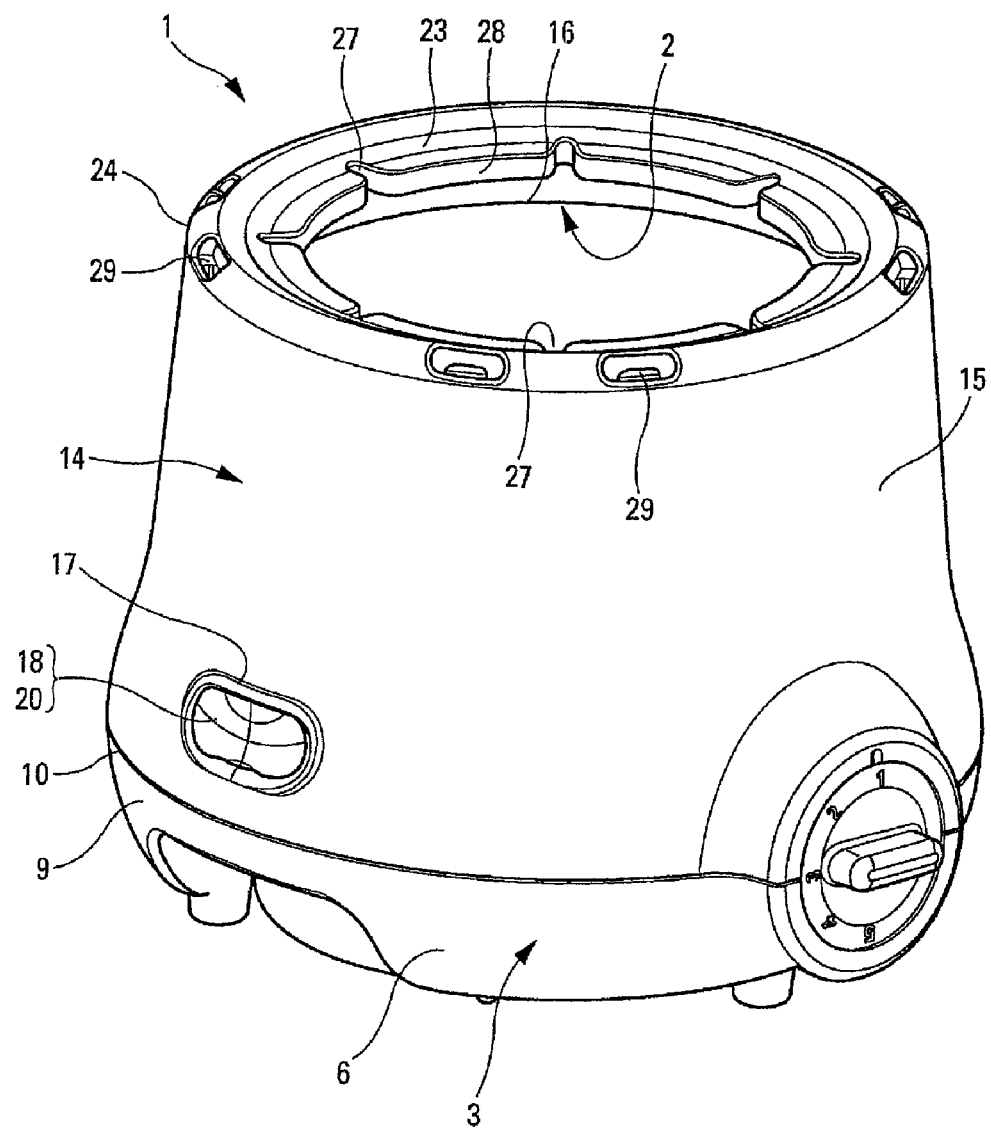

Other particular features and advantages will emerge from the following description of the embodiment provided here by way of a non-limiting example, and illustrated in the appended drawings, in which:

FIG. 1 represents, in section, a fondue pot according to this embodiment of the invention; and FIG. 2 represents the same fondue pot, shown in perspective.

As can be seen in the figures, a cooking apparatus 1 (in this case a fondue pot 1) includes a cooking receptacle 2 (in this case a caquelon 2) for the cooking of food, and a base 3 which is designed to supply to the cooking receptacle 2 the thermal energy necessary to cook the food. The cooking apparatus 1 has a top opening that is used for manipulation of the food during cooking.

The cooking receptacle 2 rests upon the base 3 and, in this present embodiment, is separable from it. The caquelon 2 is created in metal and, like any cooking receptacle 2, it includes a bottom 4 (here a solid plate, meaning one that has no opening) which rests upon the base 3, and a closed side wall 5 (also solid here) that extends vertically upwards from the bottom 4.

The base 3 includes a plinth 6 and an electrical heating device 7 located in the plinth 6.

In this present embodiment, the plinth 6 (here in a plastic material) includes a bottom 8 by means of which the cooking apparatus 1 can rest upon a work surface, and a closed side wall 9 that extends upwards from the bottom 8 and whose free top end 10 comprises a top opening.

The electrical heating device 7 includes an electric heating element 12 and a heating plate 13 placed above the electric heating element 12 and on which the caquelon 2 rests directly. The electrical heating device 7 also includes a power-feed and control system for the supply of power to the electric heating element 12. In this present embodiment, the electrical heating device 7 is located in the plinth 6 so that the heating plate 13 is more-or-less at the level of the top opening of the plinth 6.

In order to protect the users from any burns following contact with the caquelon 2, the fondue pot 1 also includes a skirt 14 (here, in a plastic material) surrounding the caquelon 2 (and therefore the side wall 5 of the latter) and thus providing thermal protection. In this present embodiment, the skirt 14 comprises a closed side wall 15 that extends vertically from the base 3 (more precisely from the plinth 6) up to beyond the free top end 16 of the side wall 5 of the caquelon 2. As a consequence the thermal protection is optimal, since no part of the outer surface of the caquelon 2 is accessible.

In this present embodiment, the skirt 14 is removable from the base 3 (more exactly from the plinth 6) and is designed to be fixed to it. In particular, this feature enables very easy cleaning of the fondue pot 1, the skirt 14 and the caquelon 2, which are free of any electrical components, and can therefore be separated from the base 3 (by the user quite easily) and cleaned in large volumes of water (in the dishwasher for example).

The side wall 15 of the skirt 14 includes locking means 17 that are designed to mate with complementary locking means 18 carried by the base 3 (here, by the side wall 9 of the plinth 6) so as to allow the attachment (quite easily removable by the user) of the skirt 14 to the base 3 (here, by click-on action) and therefore, in order to securely retain the fondue pot 1.

More precisely, the complementary locking means 18 (here, hooks 18 carried by elastically deformable tabs 19 carried by the side wall 9 of the plinth 6 to beyond the top opening) are mobile between a locked position in which they are trapped in the locking means 17 (here openings 17 through the side wall 15 of the skirt 14) and a free position in which they are released from the locking means 17. In addition, the complementary locking means 18 are pressed into their locked position (here, because of the natural elasticity of the tabs 19). In this present embodiment, when the skirt 14 is correctly attached to the base 3, its side wall 15 envelops the tabs 19, with only the hooks 18 being accessible via the openings 17.

In order to allow the movement of the complementary locking means 18 to their free position (due to the elasticity of the tabs 19), the base 3 (here, the plinth 6) includes unlocking means 20. In this present embodiment, these unlocking means 20 are attached to the complementary locking means 18, and, more precisely, they are formed by the outer surface 20 of each hook 18 that traverses the corresponding opening 17 and that, as a consequence, is accessible.

In addition, in order to avoid any overheating of the skirt 14 due to the close presence of the caquelon 2, the fondue pot 1 is shaped so that there is a more-or-less annular space 21 between the side wall 5 of the caquelon 2 and that 15 of the skirt 14. This annular space 21 also opens to the exterior of the apparatus in order to allow better removal of the heat.

Moreover, because, in this present embodiment, the skirt 14 and the caquelon 2 are separable from the base 3, the side wall 15 of the skirt 14 includes studs at its inner surface that are in contact with the side wall 5 of the caquelon 2 so as to centre (and immobilise) the latter in the horizontal plane (in the plane of the heating plate 13). These studs are made from a material that is resistant to heat (a plastic material such as bakelite for example).

The skirt 14 also includes an annular wall 23 that is carried by the side wall 15 (at the level of its free top end 24). This annular wall 23 extends in the horizontal plane to the interior of the caquelon 2, that is to beyond the free top end 16 of the side wall 5 of the latter. This annular wall 23 is used to complete the protection of the user from any burns, and to prevent food from falling into the annular space 21, amongst other things.

In order to avoid any overheating of the annular wall 23 because of the close presence of the caquelon 2, the fondue pot 1 is shaped so that there exists a more or less toroidal space 25 between the annular wall 23 and the caquelon 2. This toroidal space 25 opens to the exterior of the apparatus (toward the interior of the caquelon 2) and is connected to the annular space 21 in order to allow removal of the heat.

In addition, the annular wall 23 includes immobilisation means 26 that mate with complementary immobilisation means 16 so as to allow the immobilisation of the caquelon 2 in the vertical direction (perpendicularly to the plane of the heating plate 13) when the latter is correctly positioned on the base 3 (here, on the heating plate 13) and the skirt 14 is attached to the base 3 (here, to the plinth 6). In this present embodiment, the immobilisation means 26 are formed by spacers 26 that are carried by the lower surface of the annular wall 23 and that come into contact with the free top end 16 of the side wall 5 of the caquelon 2 forming the complementary immobilisation means 16. These spacers 26 are made from a heat resistant material (a plastic material such as bakelite for example). After correctly positioning the caquelon 2 on the base 3, the skirt 14 is placed around the caquelon 2, immobilising it in the horizontal plane, in a first stage, by means of the studs. The attachment of the skirt 14 to the base by the click-on action of the hooks 18 in the openings 17 jointly result in the vertical immobilisation of the caquelon 2 by means of the spacers 26 that bear onto the side wall 5 of the latter. The spacers 26 are also used to form the toroidal space 25.

In addition, the annular wall 23 includes a first series of orifices 27 that cross into a zone located between its free inner end 28 and the free top end 16 of the side wall 5 of the caquelon 2. These orifices 27 (here open oblong slots 27, meaning slots that open out to the free inner end 28 of the annular wall 23) are used to hold bumps in the caquelon 2 in position during the cooking operations.

The annular wall 23 also includes a second series of orifices 29 that cross into a zone located between the free top end 16 of the side wall 5 of the caquelon 2 and the free top end 24 of the side wall 15 of the skirt 14. These orifices 29 (here closed oblong openings 29) are used to suspend the bumps in the annular space 21 between two cooking operations.

The free end 16 of the side walls 5 of the caquelon and that 24 of the side walls 15 of the skirt 14 (here, more precisely, the free inner end 28 of the annular wall 23 of the skirt 14) form the top opening of the fondue pot, used for manipulation of the food during the cooking process.

This present invention is not limited to the embodiment presented in detail here. It would therefore be possible for the fondue pot to have only some of these features (or even one):
- the skirt may not be removable from the base (of the plinth),
- in the case of a removable skirt, the apparatus may not include locking means or complementary locking means,
- The locking means and complementary locking means may be different, and they may not be driven into either of their positions,
- the unlocking means may be different, and in particular they may not be attached to the locking means or complementary locking means,
- the skirt may not have any centering studs, this feature can either be absent or achieved by other means, such as by the shape of the heating plate on which the caquelon is placed,
- the skirt may not include an annular wall (in particular in the case of a fixed skirt, in order to allow the removal of the caquelon), or in the case of a fixed skirt, the annular wall may be separable from the side wall of the skirt,
- the annular wall may not have immobilisation spacers and/or orifices (either for holding in position of bumps during the cooking operations or for their suspension between two cooking operations), and the positioning orifices may be closed orifices.

Moreover, the cooking apparatus may not be a fondue pot, but can be any other cooking apparatus that includes an opening used for manipulation of the food during cooking (meaning cooking apparatus that have no articulated lids more-or-less hermetically closing off the cooking receptacle). The cooking receptacle is delimited by side walls, and these can be of particularly low height, in which case the receptacle is then a stamping created in a plate, such as a crepe pan or pancake maker. In addition, the bottom of the cooking receptacle may not be solid and may then include orifices to allow drainage of the cooking fats for example.

The invention claimed is:

1. A cooking apparatus, having a top opening that is used for manipulating food during cooking, and that includes a base, a cooking receptacle that receives food to be cooked and that rests upon the base, and a skirt that includes a closed side wall surrounding the cooking receptacle and extending vertically from the base up to at least a free top end of the side wall of the cooking receptacle, wherein the skirt is removable from the base and is designed to be attached to it, the skirt including an annular wall that is carried by the closed side wall of the skirt at a free top end thereof, and that extends, in a horizontal plane, towards an interior of the receptacle, beyond the free top end of the receptacle side wall, and the annular wall of the skirt including a first series of orifices traversing the annular wall, in a zone located between a free inner end of the skirt annular wall and the free top end of the receptacle side wall.

2. The cooking apparatus according to claim 1, characterised in that the cooking receptacle comprises a bottom which is a solid plate.

3. The cooking apparatus according to claim 1, characterised in that the side wall of the skirt includes studs that come into contact with the side wall of the receptacle so as to centre the receptacle in a horizontal plane, and to form a more-or-less annular space between the side wall of the receptacle and that of the skirt.

4. The cooking apparatus according to claim 1, characterised in that the side wall of the skirt includes locking means that are designed to mate with complementary locking means carried by the base so as to allow the freeable attachment of the skirt to the base.

5. The cooking apparatus according to claim 4, characterised in that the locking means are formed by openings designed to receive hooks that form the complementary locking means.

6. The cooking apparatus according to claim 4, characterised in that the base includes unlocking means used to move the complementary locking means into their free position.

7. The cooking apparatus according to claim 5, characterised in that the base includes unlocking means formed by an outer surface of the hooks traversing the openings, and used to move the complementary locking means into their free position.

8. The cooking apparatus according to claim 1, characterised in that the side wall of the skirt includes studs that come into contact with the side wall of the receptacle so as to centre the receptacle in the horizontal plane, and to form a more-or-less annular space between the side wall of the receptacle and that of the skirt, and in that the annular wall includes spacers that come into contact with the free top end of the side wall of the receptacle so as to immobilise the receptacle in the vertical direction and to form a more-or-less toroidal space connected to the annular space.

9. The cooking apparatus according to claim 1, characterised in that the annular wall includes a second series of orifices that traverse into a zone located between the free top end of the side wall of the skirt and that of the side wall of the receptacle.

10. A cooking apparatus, having a top opening that is used for manipulating food during cooking, and that includes a base, a cooking receptacle that receives food to be cooked and that rests upon the base, and a skirt that includes a closed side wall surrounding the cooking receptacle and extending vertically from the base up to at least a free top end of the side wall of the cooking receptacle, the skirt including an annular wall that is carried by the closed side wall of the skirt at a free top end thereof, and that extends, in a horizontal plane, towards an interior of the receptacle, beyond the free top end of the receptacle side wall, the annular wall including a series of orifices traversing the annular wall, in a zone located between a free top end of the skirt side wall and the free top end of the receptacle side wall.

11. The cooking apparatus according to claim 10, characterised in that the cooking receptacle comprises a bottom which is a solid plate.

12. The cooking apparatus according to any of claim 10, characterised in that the side wall of the skirt includes studs that come into contact with the side wall of the receptacle so as to centre the receptacle in the horizontal plane, and to form a more-or-less annular space between the side wall of the receptacle and that of the skirt.

13. The cooking apparatus according to claim 12, characterised in that the annular wall includes spacers that come into contact with the free top end of the side wall of the receptacle so as to immobilise the receptacle in the vertical direction and to form a more-or-less toroidal space connected to the annular space.

14. The cooking apparatus according to claim 10, characterised in that the annular wall includes a second series of orifices that traverse into a zone located between its free inner end and the free top end of the side wall of the receptacle.

15. A cooking apparatus, having a top opening that is used for manipulating food during cooking, and that includes a base, a cooking receptacle that receives food to be cooked and that rests upon the base, and a skirt that includes a closed side wall surrounding the cooking receptacle and extending vertically from the base up to at least a free top end of the side wall of the cooking receptacle, the skirt including an annular wall that is carried by the closed side wall of the skirt at a free top end thereof, and that extends, in a horizontal plane, towards the interior of the receptacle, beyond the free top end of the receptacle side wall, the annular wall of the skirt including a first series of orifices traversing the annular wall, in a zone located between a free inner end of the skirt annular wall and the free top end of the receptacle side wall.

16. The cooking apparatus according to claim 15, characterised in that the side wall of the skirt includes studs that come into contact with the side wall of the receptacle so as to centre the receptacle in the horizontal plane, and to form a more-or-less annular space between the side wall of the receptacle and that of the skirt.

17. The cooking apparatus according to claim 15, characterised in that the annular wall includes a second series of orifices that traverse into a zone located between the free top end of the side wall of the skirt and that of the side wall of the receptacle.

* * * * *